United States Patent [19]
Kanari

[11] Patent Number: 5,226,512
[45] Date of Patent: Jul. 13, 1993

[54] VARIABLE DAMPING FORCE SHOCK ABSORBER WITH VARIABLE ORIFICE FOR ADJUSTING DAMPING CHARACTERISTICS

[75] Inventor: Issei Kanari, Kanagawa, Japan
[73] Assignee: Atsugi Unisia Corporation, Japan
[21] Appl. No.: 980,435
[22] Filed: Nov. 23, 1992

Related U.S. Application Data

[63] Continuation of Ser. No. 481,101, Feb. 16, 1990, abandoned.

[30] Foreign Application Priority Data

Feb. 22, 1989 [JP] Japan ................................. 1-42460

[51] Int. Cl.$^5$ ............................................. F16F 9/44
[52] U.S. Cl. ............................. 188/319; 188/322.22
[58] Field of Search ............... 188/299, 319, 322.22, 188/322.5; 280/707, 714

[56] References Cited

U.S. PATENT DOCUMENTS

| | | | |
|---|---|---|---|
| 4,620,619 | 11/1986 | Emura et al. | 188/319 |
| 4,660,689 | 4/1987 | Hayashi et al. | 188/319 |
| 4,765,446 | 8/1988 | Murata et al. | 188/299 X |
| 4,776,437 | 10/1988 | Ishibashi et al. | |
| 4,826,207 | 5/1989 | Yoshioka et al. | 188/319 X |
| 4,905,799 | 3/1990 | Yamaoka et al. | |
| 5,085,300 | 2/1992 | Kato et al. | 188/322.15 |

FOREIGN PATENT DOCUMENTS

| | | |
|---|---|---|
| 0207409 | 6/1986 | European Pat. Off. . |
| 0336692 | 10/1989 | European Pat. Off. . |
| 61-164836 | 10/1986 | Japan . |
| 0307533 | 12/1989 | Japan ................... 188/319 |
| 2126687 | 3/1984 | United Kingdom . |

Primary Examiner—Robert J. Oberleitner
Assistant Examiner—Kevin D. Rutherford
Attorney, Agent, or Firm—Ronald P. Kananen

[57] ABSTRACT

A variable damping force shock absorber has a hollow cylinder, in which is disposed a thrusting piston for defining upper and lower fluid chambers. A fluid path is defined through the piston and a piston rod for establishing fluid communication between the upper and lower fluid chambers. A first flow restrictive orifice is provided in the fluid path which first flow restrictive orifice has variable flow restriction characteristics according to a first variation characteristic in relation to a piston stroke speed. A second flow restrictive orifice is also provided in the fluid path. The second flow restrictive orifice has a variable multitude flow restriction according to a second variation characteristic in relation to the piston stroke speed, which second variation characteristic is so determined as to establish, linear variation of damping force in relation to the piston stroke speed. A communication path is formed for establishing communication between the first and second flow restrictive orifices. The communication path has a first section extending radially and a second section extending axially and is defined between the piston rod and the piston.

7 Claims, 11 Drawing Sheets

VARIABLE DAMPING FORCE SHOCK ABSORBER WITH VARIABLE ORIFICE FOR ADJUSTING DAMPING CHARACTERISTICS

This application is a continuation of application Ser. No. 07/481,101 filed Feb. 16, 1990, now abandoned.

BACKGROUND OF THE INVENTION

1. Field of the Invention

The present invention relates generally to a variable damping force shock absorber for an automotive suspension system. More specifically, the invention relates to a variable damping force shock absorber which can provide substantially linear variation characteristics of damping force over various modes of vibration exerted on an automotive vehicle.

2. Description of the Background Art

Japanese Utility Model First (unexamined) Publication No. 61-164836 discloses a variable damping characteristics shock absorber of the type to which the present invention is directed. In the disclosed construction, an orifice is formed through a piston for generating damping force in response to piston stroke according to relative displacement of a vehicular body and a suspension member which rotatably supports a road wheel. An end of the flow restriction orifice is closed by a disc valve which opens and closes the end of the orifice. A fluid passage is formed through a piston rod in a parallel relationship with the flow restriction orifice. A flow control means is associated with the fluid passage for adjusting the fluid flow path in the fluid passage for adjusting the damping characteristics.

In the shown construction, higher or harder suspension characteristics or a greater damping force may be generated by a greater magnitude of flow restriction provided by the flow control means. By a greater magnitude flow restriction, smaller amount of working fluid flows through the fluid passage for generating a greater fluid pressure difference at both sides of the piston thus generating a greater damping force. On the other hand, lower or softer damping characteristics are obtained by a smaller magnitude of flow restriction for allowing a greater amount of working fluid to flow through the fluid passage. A greater amount of fluid flow through the fluid passage may reduce the fluid pressure difference at both sides of the piston for generating a smaller magnitude of the damping force.

In such construction of shock absorbers, it has been observed that, at a relatively low piston stroke speed range, the flow control means of the fluid passage is principally effective for generating a damping force. On the other hand, at a relatively high piston stroke range, the orifice is principally effective for generating a damping force. Since the orifice and flow control means have different variation characteristics of magnitude of fluid flow restriction, a smooth variation of damping characteristics through a relatively wide piston stroke speed range is difficult to achieve.

Furthermore, neither of since neither the orifice nor the flow control means may provide linear characteristics in varying the damping characteristics, the prior proposed shock absorber is still not satisfactory to achieve both vehicular driving stability and riding comfort at any vehicular driving condition.

For improving the foregoing drawback in the prior art, U.S. patent application Ser. No. 332,469, filed on Apr. 3, 1989, now U.S. Pat. No. 4,905,799, issued on Mar. 6, 1990, which has been assigned to the common assignee of the present invention, discloses a shock absorber which provides piston stroke dependent variable shock absorbing characteristics by means of a first and a second flow restriction means associated with a piston. The first and second flow restriction means are arranged in a fluid path for communicating first and second working chambers defined within a cylindrical shock absorber housing in series. The first flow restriction means is associated with an orifice forming a part of the fluid path and has a predetermined relief pressure, for providing a predetermined first fixed flow restriction rate in response to a pressure difference between the first and second chambers smaller than or equal to the relief pressure and providing a second variable flow restriction rate in response to a pressure difference between the first and second chambers greater than that associated with the orifice for providing a third variable flow restriction rate variable depending upon the pressure difference between the first and second chambers.

The aforementioned prior proposal has been published as European Patent First Publication No. 03 36 692.

A further proposal has been made in the U.S. patent application Ser. No. 408,261, filed on Sep. 18, 1989, which has been assigned to the common assignee of the present invention, and in which is disclosed a shock absorber which provides a piston stroke speed dependent linear variation characteristics of damping force. The shock absorber includes variable orifices in tandem fashion for achieving linear variation characteristics of damping force according to variation of the piston stroke. One of the variable orifices provides a variation characteristics of flow restriction for a greater variation rate of the damping force in a low piston stroke speed range, and the other provides variation characteristics of flow restriction for a greater variation rate of the damping force in the intermediate and high piston stroke speed ranges. The variable orifice may be provided in a piston assembly or in the alternative in a bottom fitting in case of a double-action type shock absorber.

In either of the prior proposals, a fluid flow path for communication of the first and second flow restriction means or two variable orifices, extends through the piston in a substantial length. Because of the orifice effect of such fluid flow path and dimensional tolerance in formation of such fluid flow path, adjustment of the damping force to be generated by the shock absorber becomes difficult.

SUMMARY OF THE INVENTION

Therefore, it is an object of the present invention to provide a variable damping force shock absorber which can solve the drawback in the prior proposals.

Another object of the invention is to provide a variable damping force shock absorber which has a minimized length of communication path for communication of a pair of variable orifices.

In order to accomplish the aforementioned and other objects, a variable damping force shock absorber has a hollow cylinder, in which is disposed a thrusting piston for defining upper and lower fluid chambers. A fluid path is defined through the piston and a piston rod for establishing fluid communication between the upper and lower fluid chambers. A first flow restrictive orifice is provided in the fluid path which first flow restrictive orifice has variable flow restriction characteristics according to a first variation characteristic in relation to a piston stroke speed. A second flow restrictive orifice is also provided in the fluid path. The second flow restrictive orifice has a variable magnitude flow restriction according to a second variation characteristic in relation to the piston stroke speed, which second variation characteristic is so determined as to establish a linear variation of damping force in relation to the piston stroke speed. A communication path is formed for establishing communication between the first and second flow restrictive orifices. The communication path has a first section extending radially and a second section extending axially and defined between the piston rod and the piston.

According to one aspect of the invention a variable damping force shock absorber for damping relative displacement between first and second movable members, having variable damping characteristics according to piston stroke speed, comprises:

a hollow cylinder defining therein first and second fluid chambers;

a piston assembly supported within the interior space of said hollow cylinder by a piston rod for thrusting movement therein, and defining the first and second fluid chambers at both sides thereof;

a fluid path means for establishing fluid communication between the first and second fluid chambers across the piston assembly;

a first damping force generating means disposed within the fluid path means and responsive to piston stroke for generating first damping force variable according to a first variation characteristic in relation to variation of the piston stroke speed;

a second damping force generating means which is externally actuated for varying flow restriction magnitude for adjusting damping characteristics; and the first and second damping force generating means being connected in series via an axially extending section of the fluid path means, which axially extending section extends between the inner periphery of the piston assembly and the piston rod.

The first damping force generating means may comprise a primary path defined in a valve body separating the first and second fluid chambers, for fluid communication between the first and second fluid chambers;

a first window opening defined on the valve body and communicated with the primary path, the first window opening being surrounded by a first land having a first surface; and a first resilient valve means resiliently biased toward the surface for normally establishing sealing contact with the first surface and responsive to fluid flow in a first flow direction generated by the piston stroke in the one stroke direction.

The shock absorber may further comprise a third damping force generating means responsive to the piston stroke for generating a second damping force variation according to second variation characteristics in relation to variation of the piston stroke speed, and the third damping force generating means being so determined as to be cooperative in one direction of piston stroke for generating an active damping force for damping relative movement of the first and second movable members, and the first and second variation characteristics being set for compensating each other for providing substantially linear variation characteristics of the active damping force in accordance with variation of piston stroke speed. Preferably, the third damping force generating means may comprise:

a subsidiary path permitting fluid communication between the first and second fluid chambers;

a second window opening formed on the valve body in fluid communication with the subsidiary path, the second window opening being defined by a second land with a second surface, and a second resilient valve means resiliently biased toward the second surface for normally establishing sealing contact with the second surface and responsive to fluid flow in a first flow direction generated by the piston stroke in the one stroke direction for forming a second flow restrictive path for fluid communication between the first and second window openings for generating the second damping force. In such case, the first and third damping force generating means are oriented in tandem fashion with respect to the fluid flow so that the first and third damping force generating means are cooperative for generating the active damping force.

BRIEF DESCRIPTION OF THE DRAWINGS

The present invention will be understood more fully from the detailed description given herebelow and from the accompanying drawings of the preferred embodiment of the invention, which, however, should not be taken to limit the invention to the specific embodiment but are for explanation and understanding only.

In the drawings.

DESCRIPTION OF THE PREFERRED EMBODIMENT

Figure 1:
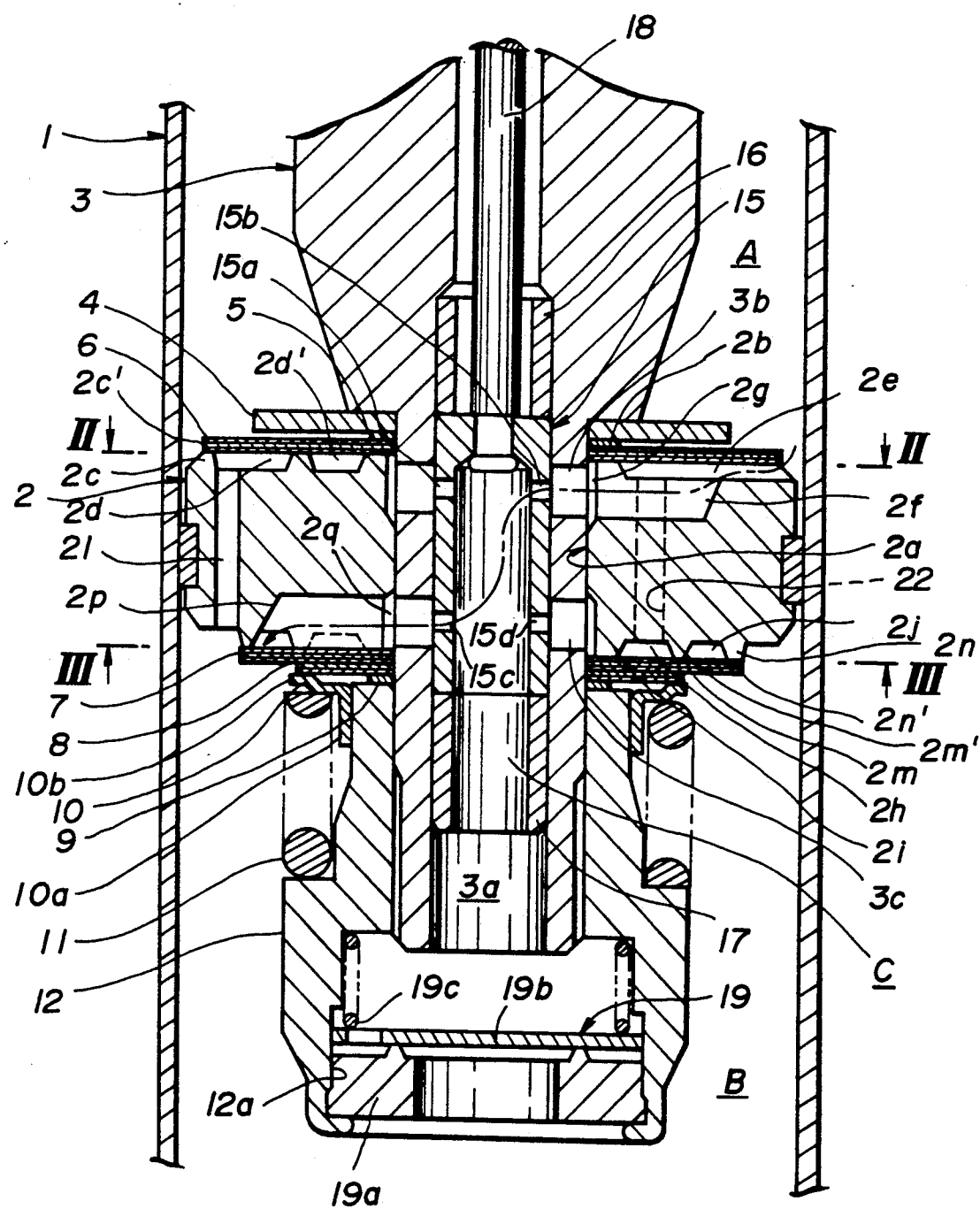
FIG. 1 is a sectional view of the major part of the first embodiment of a variable damping characteristics shock absorber according to the present invention.
Figure 2:
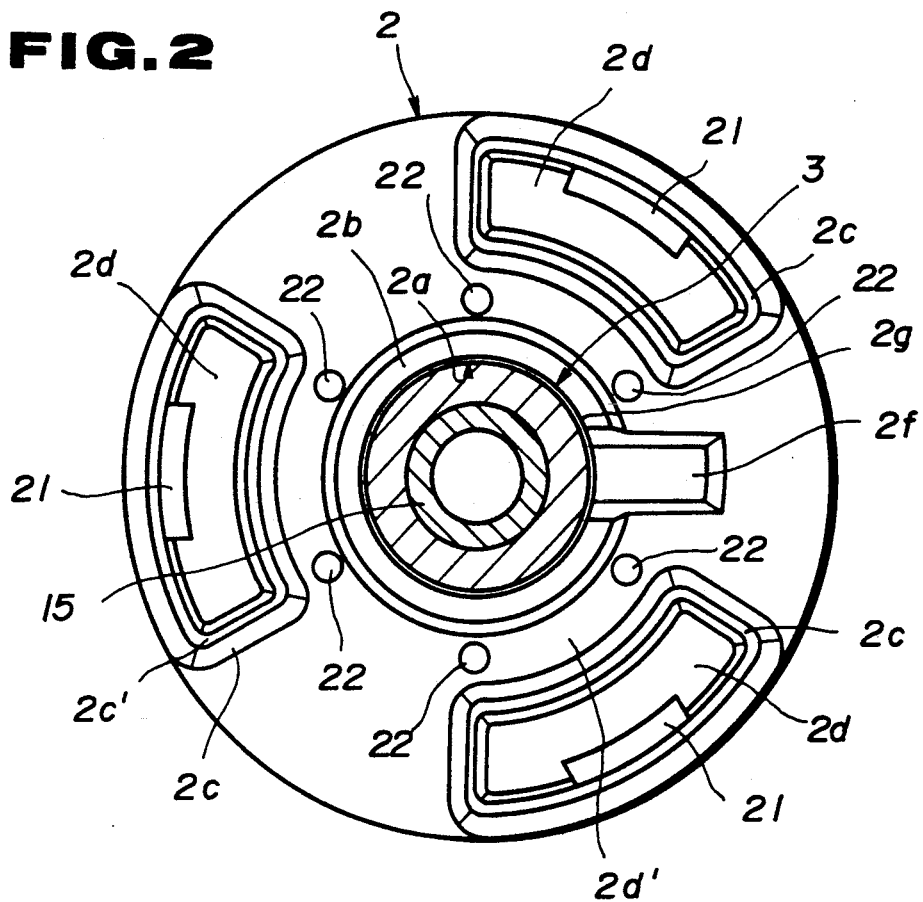
FIG. 2 is a plan view of a piston employed in the first embodiment of the shock absorber of FIG. 1.
Figure 3:
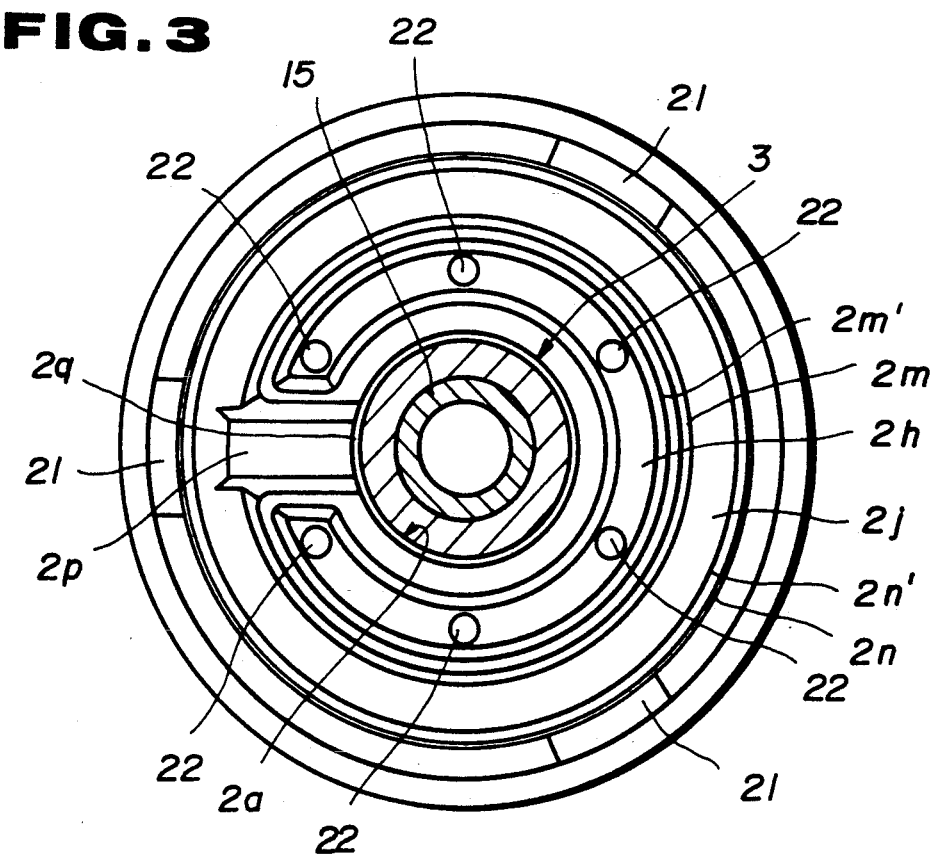
FIG. 3 is a bottom view of the piston employed in the first embodiment of the shock absorber of FIG. 1.

Referring now to the drawings, particularly to FIGS. 1 through 3, the first embodiment of a shock absorber is formed as a double-action type shock absorber including an inner and an outer cylinder coaxially arranged relative to each other. In FIG. 1, only an inner cylinder 1 is disclosed. The double-action type shock absorber per se is generally well known in the art and thus there is no need to specifically disclose the entire construction thereof. Therefore, in the drawings, the outer cylinder is neglected for simplification of illustration on the drawings and associated disclosure.

A piston assembly 2 is slidingly or thrustingly disposed within the interior space of the inner cylinder 1 to define upper and lower fluid chambers A and B which are filled with a working fluid. The piston 2 is fixed to the lower end of a piston rod 3 with a retainer 4, an upper disc valve 6, a piston body 5, a first lower disk valve 7, a second lower disc valve 8, a washer 9, a spring seat member 10 and a spring 11. The components set forth above form a piston assembly which is retained at the lower end portion of the piston rod 3 by means of a fastening nut 12.

The piston body 5 is formed with axially extending fluid passages 21 and 22. As can be seen from FIG. 1, the fluid passage 21 is oriented at a position closer to the outer periphery of the piston body 5 than that of the fluid passage 22. Therefore, in the following discussion, the fluid passage 21 will be referred to as an "outer axial passage" and the fluid passage 22 will be referred to as an "inner axial passage". As seen from FIGS. 2 and 3, in the shown embodiment, three outer axial passages 21 are formed with circumferential intervals. Each of the outer axial passages 21 is formed into an essentially arc-shaped configuration having a predetermined circumferential width, and has an upper end opening to a groove 2d defined by continuous land 2c having a valve seat surface 2c'. The upper disc valve 6 has circumferential edge portions seating on the value seat surface 2c' of the land 2c. As can be seen from FIG. 1, the upper disc valve 6 at a position completely closing the groove 2d seats the on entire seat surface 2c'. On the other hand, the lower end of the outer axial passage 21 is directly exposed to the lower fluid chamber B, so that the working fluid in the lower fluid chamber is free to flow therewithin.

On the other hand, the inner axial passages 22 respectively have circular cross sections. In the shown embodiment, six inner axial passages 22 are circumferentially arranged with equal intervals, as shown in FIGS. 2 and 3. The upper end of each of inner axial passages 22 is directly exposed to the upper fluid chamber A via a clearance 2e defined between the upper face of the piston body 5 and the upper disc valve 6. The lower end of the inner axial passage 22 is open to an inner annular groove 2h which is defined between a central boss section 2i and an annular land 2m. The annular land 2m further defines an outer annular groove 2j with an annular land 2n as particularly shown in FIGS. 1 and 3. The annular lands 2m and 2n respectively define valve seat surfaces 2m' and 2n' for seating thereon the first lower disc valve 7. Similarly to the upper disc valve 6, the first lower valve 7 normally seats on the seat surfaces 2m' and 2n' for sealing the inner and outer annular grooves 2h and 2j and is subject to the fluid pressure in the upper fluid chamber A introduced into the inner axial passages 22 via the clearance 2e.

The piston rod 3 is formed with an axially extending center opening 3a. The center opening 3a is communicated with the upper fluid chamber A via the clearance 2e, a inner annular clearance 2d' defined between a center boss 2b and the lands 2c, a radial groove 2f, an axial groove 2g which is defined between the inner periphery of the piston body 5 and the outer periphery of the piston rod 3, a radial opening 2b formed through the piston rod 3 and one set of a plurality of radial orifices 15a, 15b . . . (only two are shown) which are defined through a rotary volve member 15 and the one set of radial orifices are aligned with the radial openings 2b. The radial openings 2b will be hereafter referred to as "upper ports". The radial orifices 15a, 15b . . . will be hereafter referred to as "upper radial orifices". On the other hand, the center opening 3a is in fluid communication with the outer annular groove 2d via one set of a plurality of radial orifices 15c, 15d . . . (only two are shown), radial openings 3c, an axial groove 2q defined between the inner periphery of the piston body 2 and the outer periphery of the piston rod 3 and a radial groove or passage 2p. The radial openings 3c will be hereafter referred to as "lower ports". Also, the radial orifices 15c, 15d . . . will be hereafter referred to as "lower radial orifices", which lower radial orifices are defined through the rotary valve member 15.

The rotary valve member 15 is rotatably disposed within the axially extending opening 3b for rotation thereabout. The rotary valve member 15 is supported or maintained by upper and lower thrust bushings 16 and 17. The rotary valve member 15 is fixed to the lower end of an actuator rod 18. The actuator rod 18 is connected to a rotary actuator (not shown) for rotatingly driving the actuator rod 18 and thus drives the rotary valve member 15. The rotary actuator has been disclosed in U.S. Pat. No. 4,776,437, issued on Oct. 11, 1988 and assigned to the common assignee to the present invention, for example. The disclosure of U.S. Pat. No. 4,776,437 is herein incorporated by reference for the sake of disclosure. The rotary valve member 15 defines a lower end opened bore communicated with the center opening 3a of the piston rod 3. The rotary value member 15 has the plurality of sets of upper and lower radial orifices 15a, 15b . . . and 15c, 15d . . . at axial orientations respectively corresponding to the orientations of the upper and lower ports 3b and 3c. The plurality of sets of the upper and lower radial orifices 15a, 15b . . . and 15c, 15d . . . are circumferentially arranged so that one set of the radial orifices is aligned with the respectively corresponding upper and lower ports 3b and 3c at relevant angular positions of the rotary valve 15. Respective sets of the radial orifices 15a, 15b . . . and 15c, 15d . . . define mutually different path areas for providing different magnitudes of flow restrictions. In the shown embodiment, the rotary valve member 15 is formed with smaller diameter orifices 15a and 15c and a greater diameter orifices 15b and 15d at 90° angular intervals. Therefore, according to the angular position of the rotary valve member 15, one set of the orifices 15a, 15c and 15b and 15d is selectively aligned with the upper and lower ports 3b and 3c for providing a different path area for fluid communication between the interior space of the rotary valve member 15 and the upper fluid chamber A. As can be seen from FIG. 1, the interior space of the rotary valve member 15 is in fluid communication with the center opening 3a of the piston rod 3 for defining a chamber C extending in axial direction. Therefore, the chamber defined by the interior space of the rotary valve member 15 and the center opening 3a will be hereafter referred to as an "axial chamber".

The nut 12 is engaged with the threaded lower end of the piston rod. The nut 12 defines a lower end opened bore 12a through which the interior space of the central opening 3a of the piston rod 3 communicates with the lower fluid chamber B. A check valve assembly 19 including an annular valve seat 19a fixed to the lower end of the nut 12, a valve disc 19b and a bias spring 19c, is disposed within the bore 12a. The valve disc 19b is normally biased toward the valve seat 19a by means of the bias spring 19c in order to permit fluid flow directed from the lower fluid chamber B to the upper fluid chamber A via the center opening 3a and to block fluid flow in the opposite direction. The spring seat 10 is associated with the nut 12 for movement therealong. The spring seat 10 has a cylindrical section 10a and an outwardly and essentially horizontal flange-like section 10b on which one end of the spring 11 is seated. The other end of the spring 11 is seated on the stepped section of the nut. Therefore, the spring seat 10 is normally biased upwardly.

The second lower disc valve 8 has its external diameter substantially corresponding to the outer diameter of the annular seat surface 2m'. Therefore, the spring seat 10 is associated with the second lower disc valve 8 for exerting a biasing force of the spring 11 to the latter and thus exerting the spring load onto the first disc valve 7.

Figure 4:
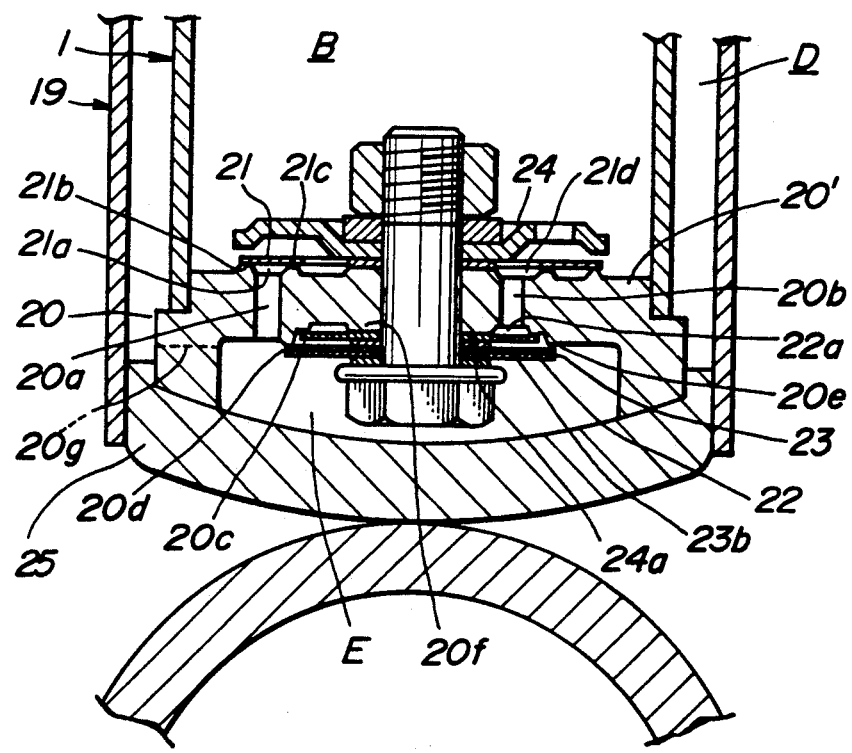
FIG. 4 is a sectional view showing construction of a bottom valve employed in the first embodiment of the shock absorber of FIG. 1.

As shown in FIG. 4, a bottom valve assembly 20 is fitted to the lower end of the inner cylinder 1 for controlling fluid communication between the lower fluid chamber B and an annular reservoir chamber D defined between the inner cylinder 1 and an outer cylinder 19. The bottom valve assembly 20 includes a bottom fitting 20' rigidly fitted to the lower end of the inner cylinder 1. The bottom fitting 20a defines axial openings 120a and 20b for fluid communication between the lower fluid chamber B and a chamber E defined between the bottom fitting 20' and a bottom closure 20b. The upper end of the axial opening 20a opens to an outer annular groove 21a defined between lands 21b and 21c, which outer annular groove is closed by an upper disc valve 21. Adjacent the upper disc valve 21 is provided a stopper washer 24 which restricts magnitude of deformation of the disc valve for defining a maximum path area to be formed between the land 21c and the outer circumferential edge portion of the upper disc valve 21. The lower end of the axial opening 20a is exposed to the chamber E. On the other hand, the upper end of the axial opening 20b opens to an inner annular groove 21d which is in direct fluid communication with the lower fluid chamber B via a through opening 21c formed through the disc valve 21. The lower end of the axial opening 20b opens to an annular groove 22a defined between land 20c and a center bore 20f. A first lower disc valve 22 seats on the land 20c for normally closing the annular groove 22a. A second lower disc valve 23 seating on an annular land 20d is placed in a spaced apart relationship with the first lower disc valve 22 via a spacer washer 23b. The land 20d is formed with a radially extending groove 20e serving as flow restricting orifice. A fastening member 24a secures the assembly together.

The chamber E defined in the bottom fitting 120' is communicated with the reservoir chamber D via an radial path 120g defined through the circumferentially extending cylindrical portion of the bottom fitting.

The operation of the aforementioned first embodiment of the shock absorber will be discussed herebelow with respect to bounding and rebounding mode operations.

During a piston rebounding stroke to cause compression of the volume of the upper fluid chamber A, the pressure of the working fluid in the upper fluid chamber is naturally increased to be higher than that in the lower fluid chamber B. As a result, as working fluid flow from the upper fluid chamber A to the lower fluid chamber B is generated. Part of the working fluid then flows into the inner axial passage 22 via the clearance 2e. Then, the working fluid having pressure higher than that in the lower fluid chamber B becomes active on the portion of the first lower disc valve 8 opposing the inner annular groove 2n to cause deformation of the first and second disc valves 7 and 8 thus to flow into the outer annular chamber 2j and subsequently into the lower fluid chamber B through an annular clearance defined between the circumferential edge portion of the first disc valve 7 and the seat surface 2n' of the land 2n.

On the other hand, the other part of the working fluid flows into the axial chamber C via the clearance 2e, the radial groove 2f, the axial groove 2g, the upper ports 3b and the upper radial orifices 15a or 15b which are aligned with the upper ports. At this time, since the fluid pressure in the axial chamber C is held higher than that in the lower fluid chamber B, the valve disc 19b is tightly seated on the valve seat 19a for blocking fluid flow therethrough. Therefore, the fluid flows into the outer annular groove 7d via the lower radial orifice 15d or 15e, the lower ports 3d, the axial groove 2q, the inner annular groove 2i and a circumferentialy extending orifice defined between the first disc valve 7 and the seat surface 2m' of the land 2m by deformation of the first and second disc valves 7 and 8. Subsequently, the fluid flows into the lower fluid chamber B defined between the circumferential portion of the first disc valve 7 and the seat surface 2n' of the land 2n.

At this time, since magnitude of deformation of the first lower disc valve 7 with respect to the seat surface 2n' is restricted by the resilient force of the second lower disc valve 8 as loaded by the spring force of the spring 11, the deformation magnitude of the first lower disc valve 7 at the portion corresponding to the seat surface 2m' is limited to provide greater flow restriction. Such flow restriction may be substantial while the pressure difference between the upper and lower fluid chambers A and B is relatively small. Since the pressure difference between the upper and lower fluid chambers is essentially proportional to the piston stroke, the flow restriction may be substantial at a low piston stroke range. On the other hand, by increasing the piston stroke speed, the pressure difference becomes greater to overcome the spring force of the spring 11 to cause shifting of the spring seat member 10 away from the second lower disc valve 8. As a result, only the resilient forces of the first and second lower disc valves 7 and 8 become active for restricting the path area for allowing greater deformation to provide a wider path area. If the pressure difference becomes substantial, an orifice effect of the tandem orifices become smaller in generating a damping force.

Therefore, in the shown construction, the orifices are defined between the first disc valve 7 and the seat surface 2m' of the land 2m and between the first disc valve 7 and the seat surface 2n' of the land 2n in tandem fashion. At a relatively low piston speed range, these orifices are principally effective for generating a damping force for a relatively low pressure difference between the upper and lower fluid chambers A and B and thus for a small magnitude of deformation of the first disc valve 7. On the other hand, at intermediate and higher piston speed ranges, a greater pressure difference between the upper and lower fluid chambers A and B is generated for causing greater deformation magnitude of the first disc valve 7, therefore, the throttling effect of the orifices becomes smaller. Therefore, at this speed range, the orifice effect of the orifices 15a or 15b and 15c or 15d is principally active for generating a damping force.

Figure 5:
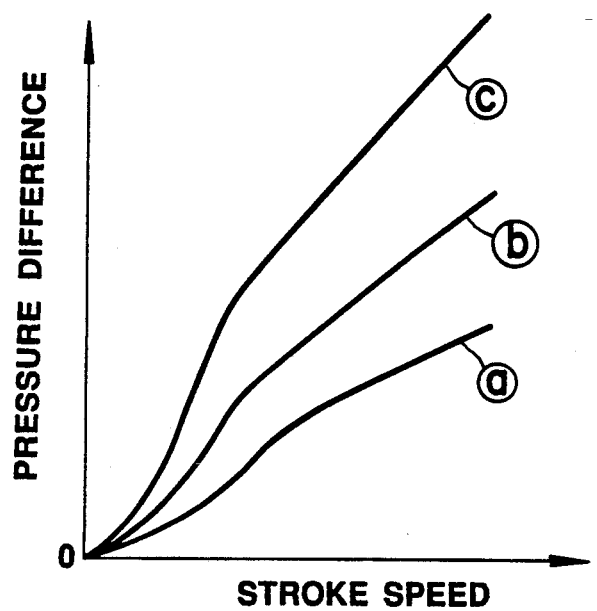
FIG. 5 is a graph showing a relationship between a pressure difference between the inner and outer axial grooves and a piston stroke speed, during a piston rebounding stroke.

FIG. 5 shows pressure difference between the inner and outer grooves 2j and 2h in relation to piston stroke speed magnitude. It should be appreciated, in the characteristics shown in FIGS. 5 through 8, the line a shows characteristics obtained at the angular position of the rotary valve member 15 where the orifices 15a and 15c are aligned with the upper and lower ports 3b and 3c, the line b shows characteristics obtained at the angular position of the rotary valve member 15 where the openings 15b and 15d are aligned with the upper and lower ports, and the line c shows characteristics obtained at the angular position of the rotary valve member where the upper and the lower ports are fully blocked. As will be appreciated, this pressure difference exhibits an orifice effect at the orifice defined between the first lower disc valve 8 and the seat surface 2m' of the land 2m. Therefore, because of substantial restriction of deformation by the spring force exerted through the second lower disc valve, a variation rate of the pressure difference is held small in the low piston stroke range. On the other hand, a variation rate of pressure difference becomes greater according to increasing of the piston stroke speed. In addition, as can be observed from FIG. 5, the variation characteristics of the pressure difference obtained at the orifice between the inner and outer grooves 2h and 2j is close to linear characteristics. This tendency is increased as increasing the piston stroke speed.

Figure 6:
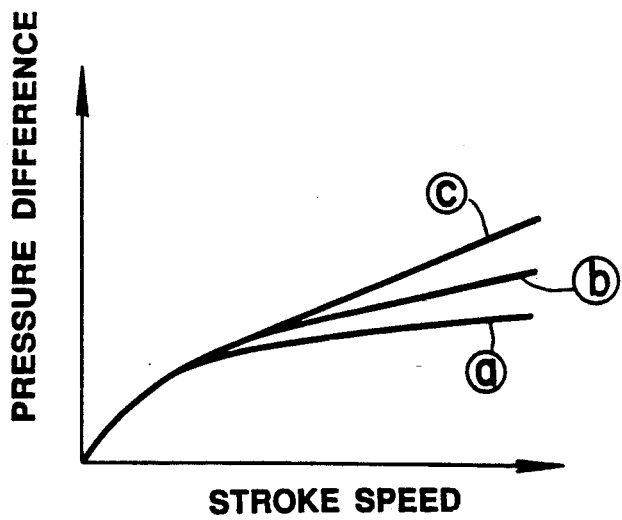
FIG. 6 is a graph showing a relationship between a pressure difference between the outer axial groove and a lower fluid chamber and the piston stroke speed.
Figure 7:
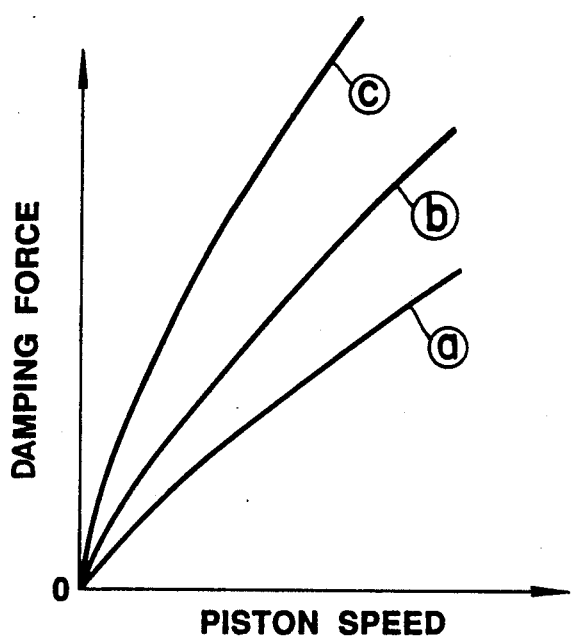
FIG. 7 is a graph showing a relationship between a damping force generated in the piston rebounding stroke and the piston stroke speed.

FIG. 6 shows variation of pressure difference between the outer groove 2j and the lower fluid chamber B. As can be seen from FIG. 6, at any of the angular positions of the rotary valve member 15, a greater variation rate of the pressure difference is caused at a low piston stroke speed range. The variation rate of the pressure difference is reduced according to increasing of the piston stroke speed. Furthermore, the characteristics of variation of the variation rate of the pressure difference at the intermediate and high piston stroke speed range is substantially linear.

Since orifices defined between the first lower disc valve 8 and the seat surface 2m' and between the first lower disc valve 7 and the seat surface 2n' are arranged in tandem fashion, the damping characteristics to be generated becomes a combination of the characteristics of FIGS. 5 and 6. Therefore, a substantially linear damping characteristics in relation to the piston stroke speed can be obtained at any piston stroke speed range.

In the piston bounding stroke, the volume of the lower fluid chamber B is compressed to cause higher fluid pressure. Therefore, fluid flow from the lower fluid chamber B to the upper fluid chamber A is generated.

Part of the working fluid flows into the outer axial passage 21 for exerting fluid pressure to the corresponding portion of the upper disc valve 6 to cause deformation of the latter. By deformation, an annular orifice is formed between the upper disc valve 6 and the seat surface 2c' of the land 2c for permitting fluid flow therethrough. The other part of the working fluid flows into the axial chamber C by shifting the valve disc 19b away from the valve seat 19a. Then, the working fluid in the axial chamber C is flows through the orifices 15a or 15b and the upper port 3b into the upper fluid chamber A. Part of the fluid due to the increased pressure in the axial chamber C then flows into the axial groove 2g via the radial orifice 15a or 15b and the upper ports 3a, and subsequently into the upper fluid chamber A via the radial groove 2f and the clearance 2e. Another part of the fluid in the axial chamber C flows into the radial orifices 2c or 2d, the lower part 3c, the axial groove 2q and the radial groove 2p. Therefore, the fluid pressure in the outer annular passage 2j is increased to be higher than that in the inner annular chamber 2h. The increased fluid pressure in the outer annular groove 2j flows into the inner annular groove 2h and then flows into the upper fluid chamber A via the inner axial openings 22 and the clearance 2e.

While the piston stroke speed is relatively low, the pressure difference between the first and the second lower disc valve 7 is held small so as not to cause deformation of the disc valve. As a result, the second lower disc valve stays on the seat surface of the land 2m'. Therefore, fluid flow is then permitted only through the radial groove 2e and through the orifice defined between the upper disc valve 6 and the seat surface 2c' of the land 2c. At this time, the radial orifice and the orifice defined between the upper disc valve 6 and the seat surface 2c' is active for providing flow restriction to generate damping force. On the other hand, at the intermediate and high piston stroke speed range, the pressure difference between both sides of the first and second disc valve 7 and 8 becomes substantial to cause deformation of the disc valve for forming an annular orifice to permit fluid flow therefore. Therefore, in such case, the annular orifice thus formed becomes active for generating the damping force.

Figure 8:
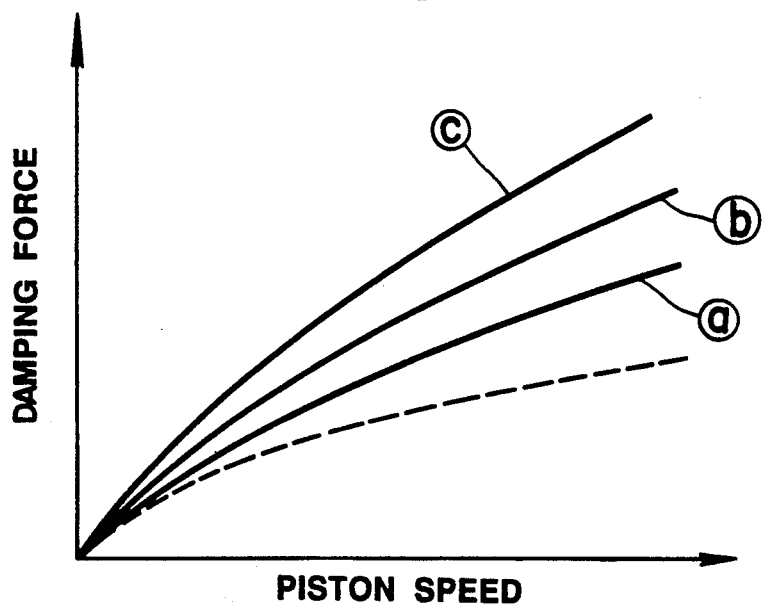
FIG. 8 is a graph showing a relationship between a damping force generated in the piston bounding stroke and the piston stroke speed.

A combination of orifice effect in the annular orifice formed between the upper disc valve 6 and the seat surface 2c of the land 2c, and the orifice effect in the annular orifice formed between the first lower disc valve 7 and the seat surface 2m' of the land 2m, provides linear characteristics in variation of the damping characteristics in the piston bounding in relation to the piston stroke speed can be obtained as shown in FIG. 8.

Figure 9:
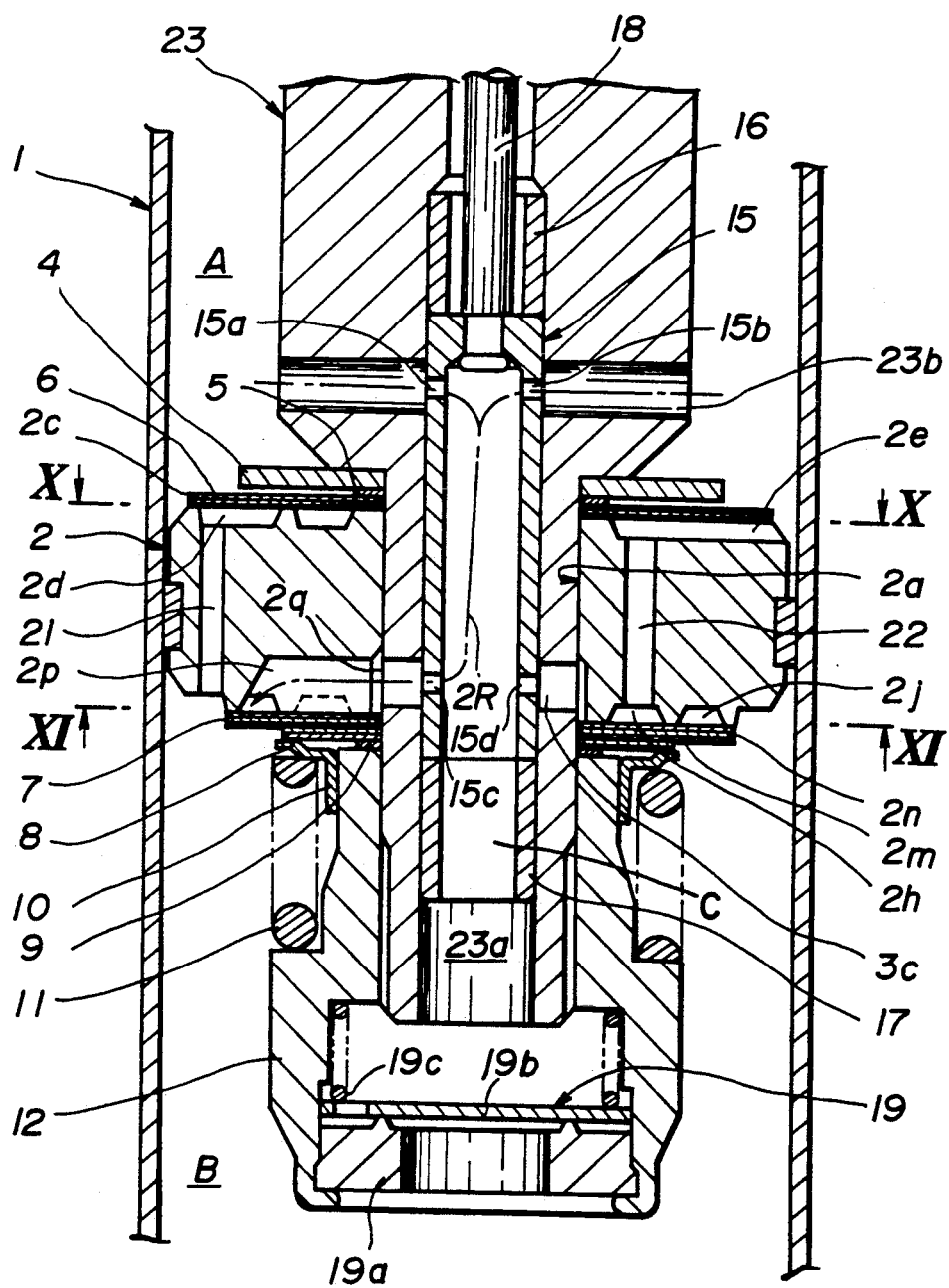
FIG. 9 is a sectional view of the major part of the second embodiment of a variable damping characteristics shock absorber according to the present invention.
Figure 10:
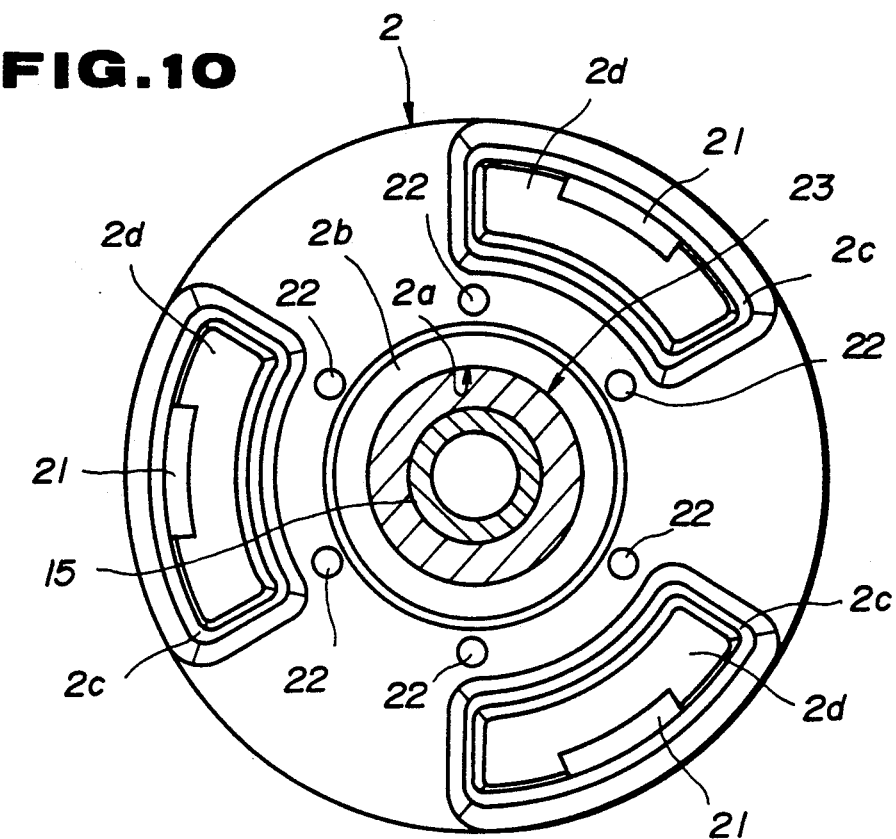
FIG. 10 is a plan view of a piston employed in the second embodiment of the shock absorber of FIG. 9.
Figure 11:
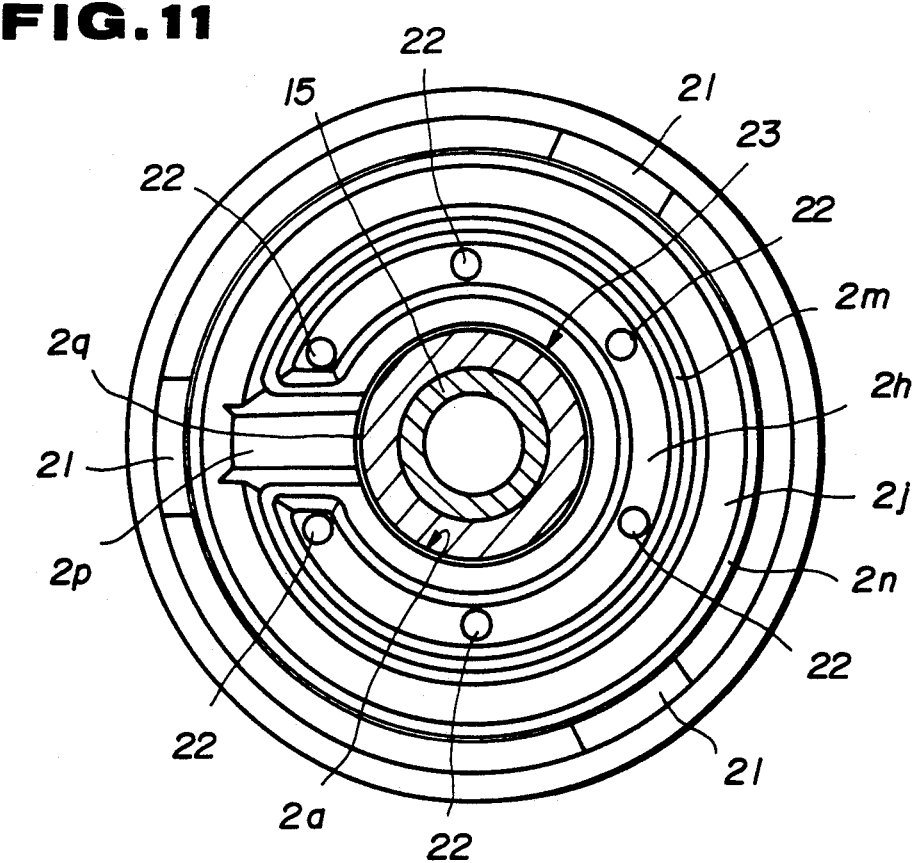
FIG. 11 is a bottom view of the piston employed in the second embodiment of the shock absorber of FIG. 9.

FIG. 9 shows the second embodiment of a variable damping force shock absorber according to the present invention. The shown embodiment is differentiated from the foregoing first embodiment in the construction for establishing fluid communication between the axial chamber C and the upper fluid chamber A. In the shown embodiment, upper ports 23b are formed at a different orientation to that in the foregoing embodiment. Namely, in the shown embodiment, the the upper ports 23b directly open toward the upper fluid chamber A. Accordingly, the upper radial orifices 15a and 15b are formed at a corresponding axial orientation of the rotary valve member 15. In this embodiment, it becomes unnecessary to form the axial groove 2g and the radial groove 2f.

With the shown construction of the second embodiment, substantially the equivalent effect of linear variation of the damping force as that can be achieved in the former embodiment.

Figure 12:
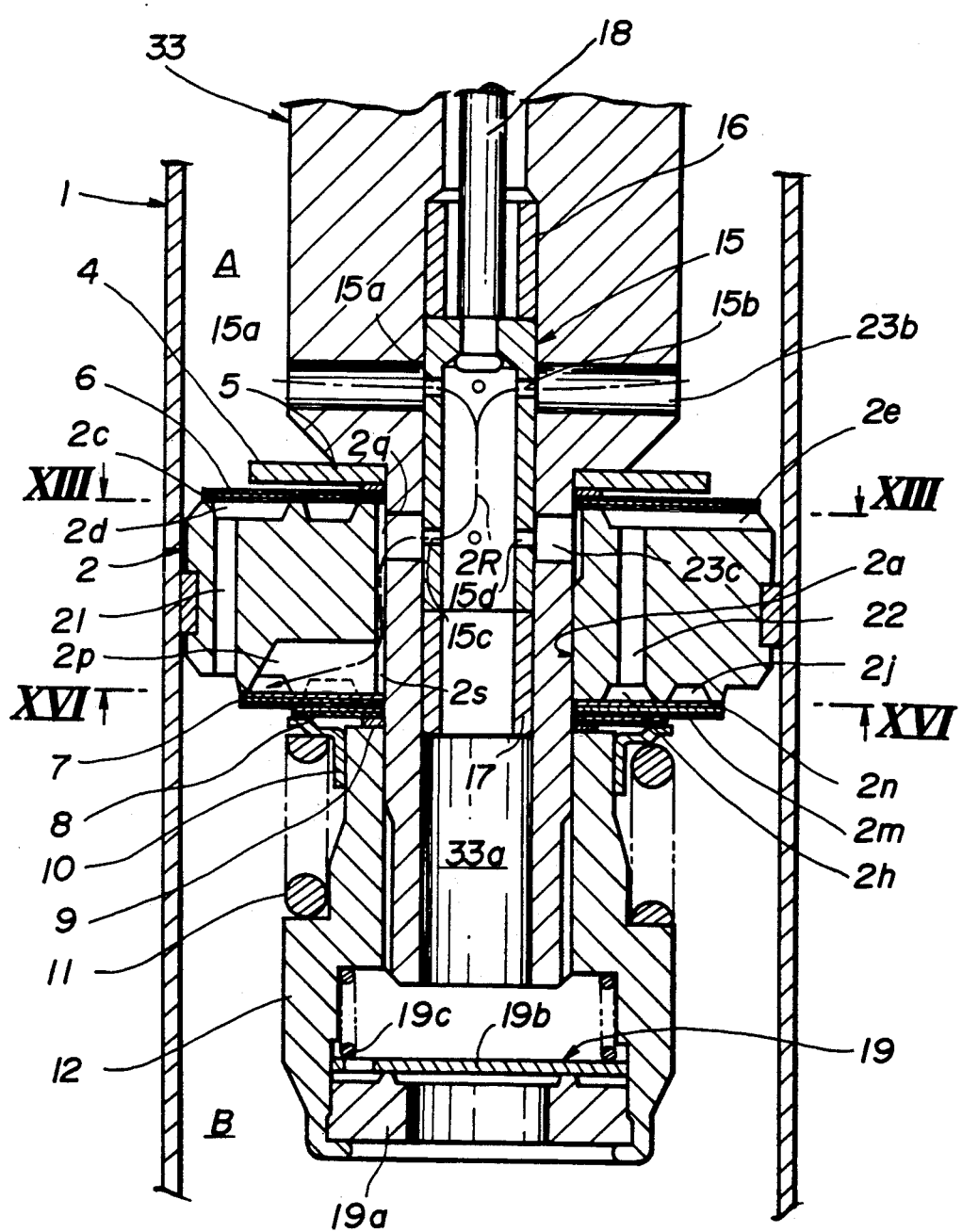
FIG. 12 is a sectional view of the major part of the third embodiment of a variable damping characteristics shock absorber according to the present invention.
Figure 13:
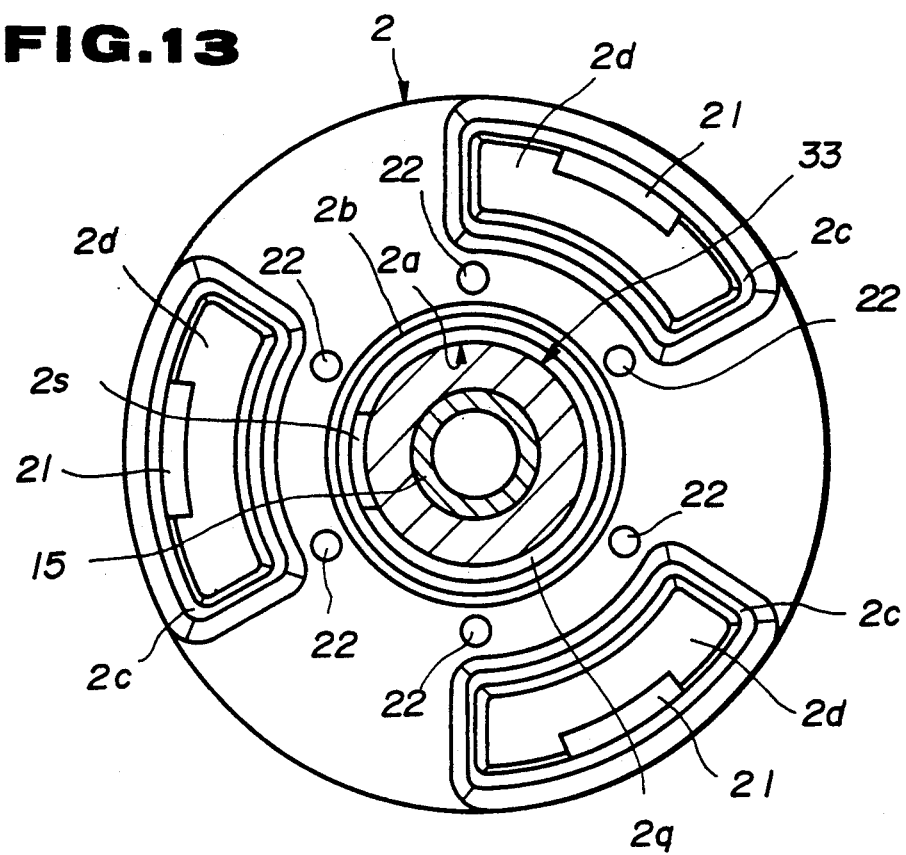
FIG. 13 is a plan view of a piston employed in the third embodiment of the shock absorber of FIG. 12.
Figure 14:
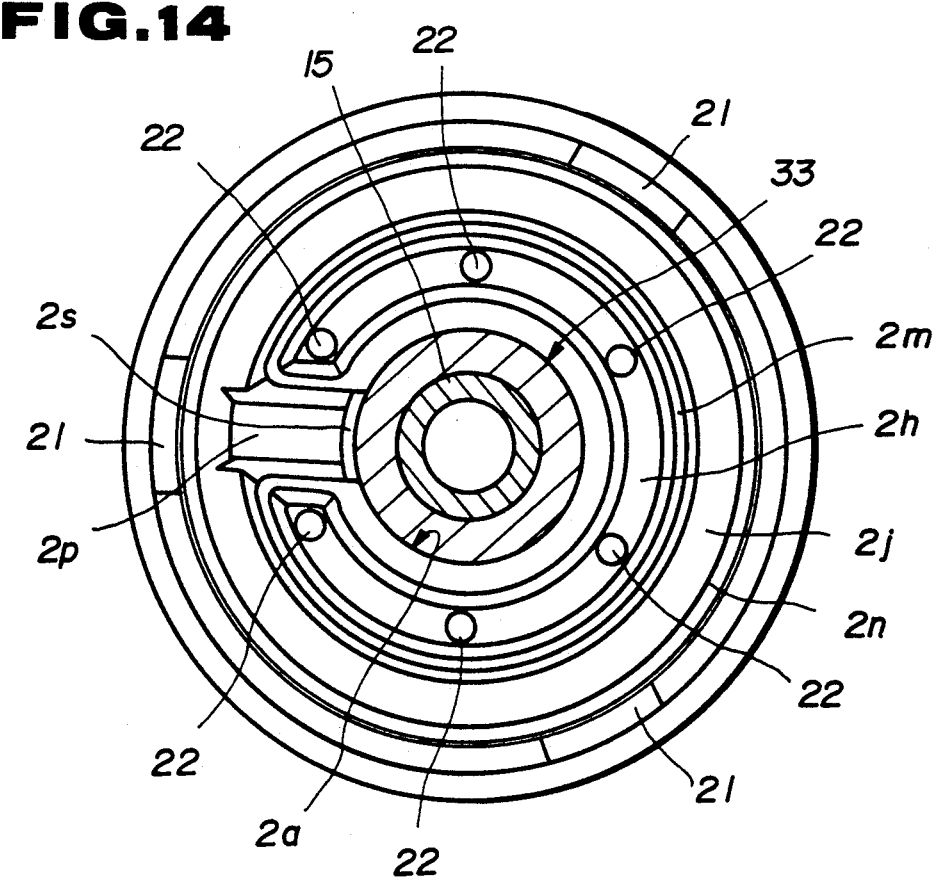
FIG. 14 is a bottom view of the piston employed in the second embodiment of the shock absorber of FIG. 12.

FIGS. 12 through 14 illustrate the third embodiment of the shock absorber according to the present invention. In this embodiment, the upper ports 23b and the associated radial orifices 15a and 15b are axially oriented at the axial position corresponding to that of the foregoing second embodiment. In the shown embodiment, an axial, groove 2s which extends substantially for the overall axial length of the piston body 5 is formed in place of the axial groove 2q. The axial groove 2g is formed. The lower ports 23c and the associated radial orifices 15c and 15d are axially oriented at the axial position corresponding to the position of the upper ports 3b and the upper radial orifices 15a and 15b of the first embodiment. As can be seen from FIGS. 12 and 14, the axial groove 2s establishes fluid communication between the axial groove 2g and the radial passage 2p.

With the shown construction, the linear variation characteristics of damping force can be achieved as in the former embodiments. In addition to this, according to the shown embodiment, the axial length of the rotary valve member 15 can be made shorter than that in the second embodiment.

Figure 15:
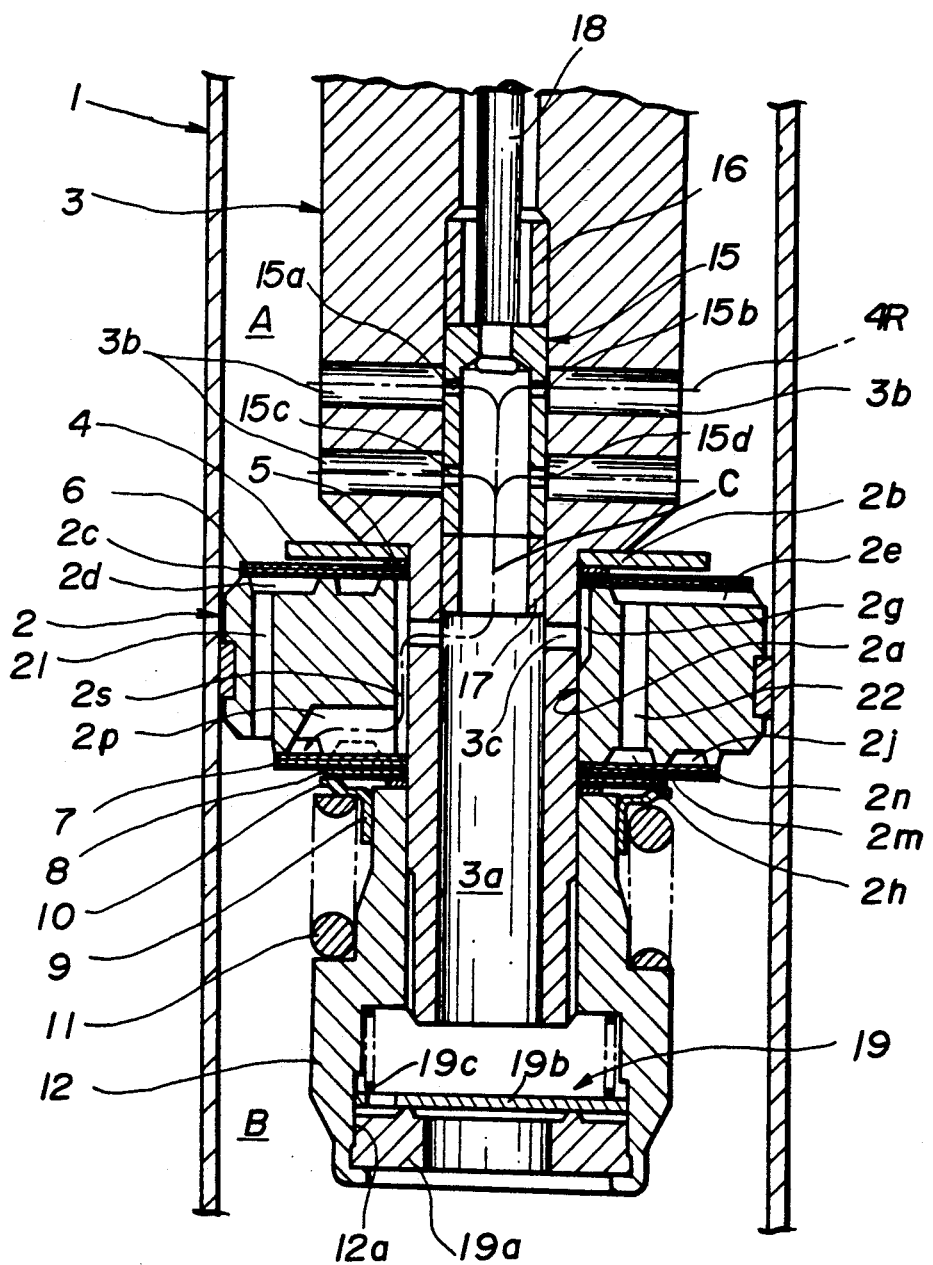
FIG. 15 is a sectional view of the major part of the fourth embodiment of a variable damping characteristics shock absorber according to the present invention.

FIG. 15 shows the fourth embodiment of a variable damping force shock absorber according to the present invention. The shown embodiment has common components and constructions to the foregoing first embodiment. The common components will be represented by the same reference numerals to the first embodiment and will not be discussed in detail.

The shown embodiment is differentiated from the first and second embodiments in the construction for establishing fluid communication between the axial chamber C and the outer annular groove 2j. In the shown embodiment, the radial groove 2p is formed on the lower surface of the piston body 5. The radial passage 2p establishes fluid communication between the outer annular groove 2j and an axial groove 2g which is in fluid communication with an upper end opened annular groove 2s. The annular groove 2s is in fluid communication with the axial chamber C.

On the other hand, the piston rod 3 is formed of upper and lower ports 3b and 3c at axially offset positions to each other. Both of upper and lower ports 3b and 3c are in fluid communication with the upper fluid chamber A. The ports 3b and 3c are, in turn, in fluid communication with the axial chamber via the upper and lower radial orifices 15a, 15b and 15c, 15d, in which the orifice 15a has a different diameter than the orifice 15b and the orifice 15c has a different diameter than the orifice 15d. In this respect, all of the orifices 15a, 15b and 15c, 15d are aligned with the ports 3b and 3c, these openings may be aligned with or shifted away from the port 3b and 3c for varying flow restriction provided therefore.

In the shown construction, the working fluid flows into the outer annular groove 2d from the upper fluid chamber via the ports 3b and 3c and the radial orifices 15a or 15b and 15c or 15d during piston rebounding stroke. This fluid pressure thus introduced into the outer annular groove 2d cooperates with the fluid pressure introduced into the inner annular groove 2d' via the inner axial passage 2e for providing linear variation characteristics of the damping characteristics as that provided in the first embodiment.

Figure 16:
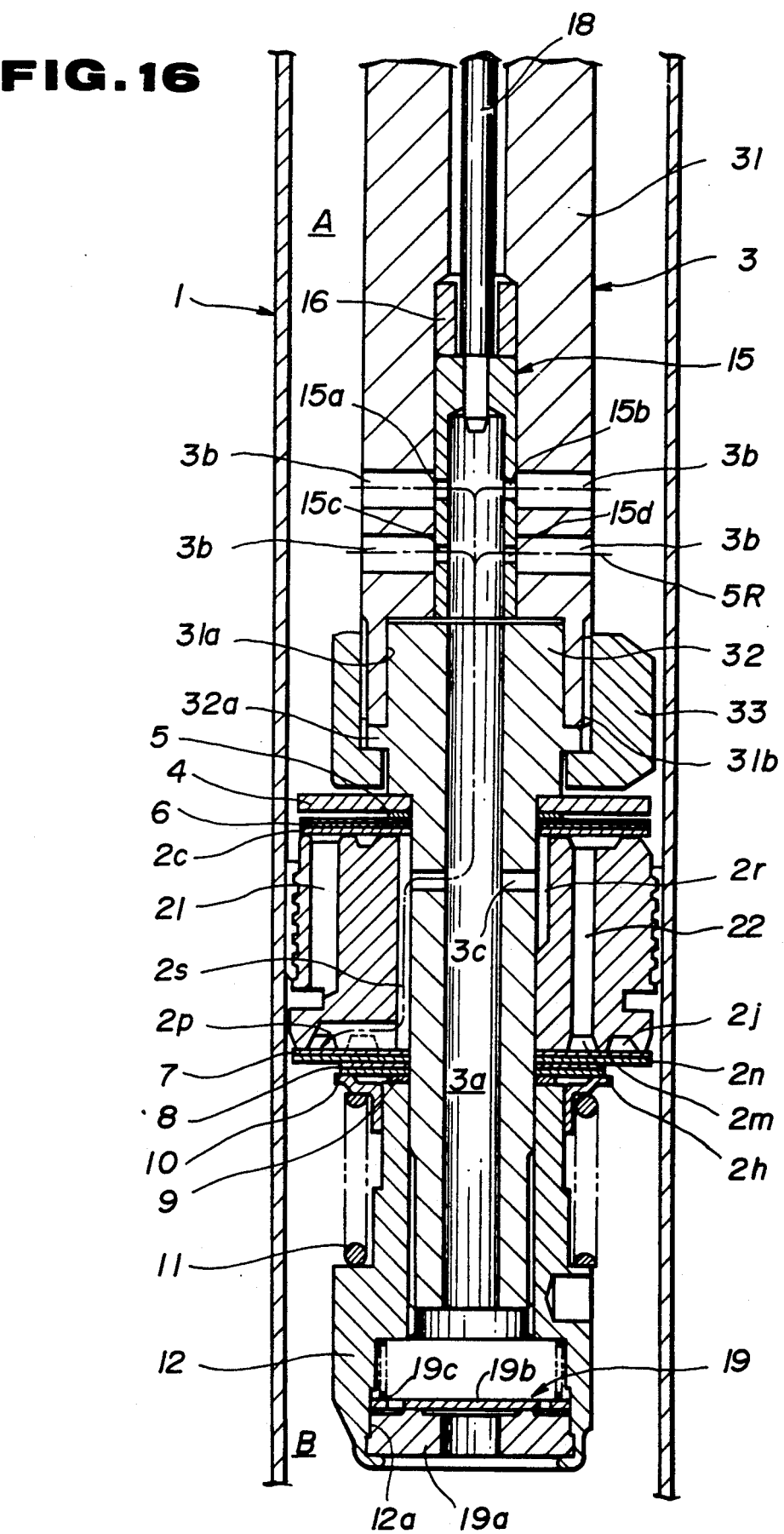
FIG. 16 is a sectional view of the major part of the fifth embodiment of a variable damping characteristics shock absorber according to the present invention.

In addition, in the shown fifth embodiment seen in FIG. 16, the piston rod 3 comprises an upper rod member 31 and a lower rod member 32 connected to each other by means of an union nut 33. For receiving the upper end portion of the lower rod member 32, a receptable bore 31a is formed at the lower end of the upper rod member 31. In order to define the axial position of the top end portion, the lower rod member 32 is formed with a radially extended flange section 32a. The flange section 32a engages with union nut 33. The union nut 33 engages with union threads 31b formed on the outer periphery of the upper rod section.

With this construction, the rotary valve member 15 can be pre-assembled with the upper rod member and the piston assembly can be pre-assembled with the lower rod member, and pre-assemblies of the upper and lower rod members are simply connected for completing the assembling operation. This clearly assists for simplifying the assembling operation.

Since the fluid action during the piston bounding stroke is identical to that in the foregoing first embodiment, essentially the same linear variation characteristics can be obtained.

In addition, in the shown embodiment, since the fluid communication between the axial chamber and the upper fluid chamber is established with two axially offset radial openings, each opening can be smaller than that in the former embodiments. Consequently, the rotary valve member can be constructed smaller for reducing required force for rotatingly driving and positioning the same at desired angular position. Also, since the radial passage 2p of the shown embodiment is an axially elongated groove, fluid communication can be assured even when the piston body and the piston rod are within tolerance extreme.

While the present invention has been disclosed in terms of the preferred embodiment in order to facilitate better understanding of the invention, it should be appreciated that the invention can be embodied in various ways without departing from the principle of the invention. Therefore, the invention should be understood to include all possible embodiments and modifications to the shown embodiments which can be embodied without departing from the principle of the invention set out in the appended claims.

What is claimed is:

1. A variable damping force shock absorber, comprising:
   a hollow cylinder having cylindrical wall means defining a cylindrical bore containing a hydraulic damping fluid,
   a hollow piston rod;
   a piston fixedly mounted to said hollow piston rod and slidably disposed in said cylindrical bore to divide said cylindrical bore into a first chamber and a second chamber;
   said piston having a first axial end surface adjacent said first chamber and a second axial end surface adjacent said second chamber,
   said second axial end surface being formed with a first annular land, a radially outer groove surrounded by said first annular land, a radially inner groove and a second land disposed radially inwardly of said first annular land and separating said radially inner groove from said radially outer groove, a damping valve having a valve disk seated on said first annular land and said second land;

means for defining a passage establishing fluid communication only between said first chamber and said radially inner groove;

said piston being formed with a central bore receiving therein said hollow piston rod and having wall means defining said central bore, said wall means defining said central bore including an axial groove extending axially inwardly from one of said first and second axial end surfaces, said second axial end surface of said piston being formed with a radial passage connected to said radially outer groove and said axial groove, and an adjustable valve movably mounted within said hollow piston rod and including an axial chamber, said adjustable valve including means for variably restricting fluid communication between said first chamber and said axial groove through said axial chamber.

2. A variable damping force shock absorber as claimed in claim 1, wherein said second land has a pair of radial portions separating said radially inner groove from said radial passage.

3. A variable damping force shock absorber as claimed in claim 1, wherein said passage defining means includes a plurality of axial passages with which said piston is formed, each having one end opening to said radially inner groove.

4. A variable damping force shock absorber as claimed in claim 3, wherein said hollow piston rod is formed with radial openings communicating directly with said axial groove.

5. A variable damping force shock absorber, comprising:

a hollow cylinder having cylindrical wall means defining a cylindrical bore containing a hydraulic damping fluid;

a hollow piston rod;

a piston fixedly mounted to said hollow piston rod and slidably disposed in said cylindrical bore to divide said cylindrical bore into a first chamber and a second chamber;

said piston having a first axial end surface adjacent said first chamber and a second axial end surface adjacent said second chamber;

said second axial end surface being formed with a first annular land, a radially outer groove surrounded by said first annular land, a radially inner groove and a second land disposed radially inwardly of said first annular land and preventing fluid communication between said radially inner groove from said radially outer groove;

a damping valve having a valve disk seated on said first annular land and said second land;

said piston being formed with a plurality of passages, each having one end opening to said radially inner groove and an opposite end communicating with said first chamber, said piston being formed with a central bore receiving therein said hollow piston rod and having wall means defining said central bore, said central bore defining wall means including an axial groove extending axially inwardly from one of said first and second axial end surfaces, said hollow piston rod being formed with radial openings communicating directly with said axial groove, said second axial end surface of said piston being formed with a radial passage connected to said radially outer groove and said axial groove; and an adjustable valve movably mounted within said hollow piston rod and including an axial chamber, said adjustable valve including means for variably restricting fluid communication between said first chamber and said axial groove through said axial chamber, said variably restricting means of said adjustable valve including a hollow rotary valve member formed with a plurality of angularly spaced orifices adapted to mate with said radial openings.

6. A variable damping force shock absorber as claimed in claim 5, wherein said radial passage is open to said axial groove.

7. A variable damping force shock absorber as claimed in claim 5, wherein said wall means defining said central bore is formed with a transfer groove establishing fluid communication between said radial passage and said axial groove.

* * * * *